Patented Oct. 29, 1946

2,410,078

UNITED STATES PATENT OFFICE 2,410,078

UNIFIED FIBROUS FABRIC

Waldo Kellgren, St. Paul, Minn., assignor to Minnesota Mining & Manufacturing Company, St. Paul, Minn., a corporation of Delaware No Drawing. Application August 3, 1940, Serial No. 351,232

6 Claims. (Cl. 117—155)

This invention relates to flexible unified fibrous fabrics, and method of making, wherein a felted or woven porous fabric (such as a paper or cloth) is unified by saturation or sizing with a non-hygroscopic water-insoluble rubber-resin composition, vulcanized in situ in a particular manner, which binds the fibres together and toughens the fabric, and at the same time imparts other desirable characteristics, but without making the backing undesirably stiff.

Unified fabrics made in accordance with this invention may be used for various purposes, such as a backing for adhesive tape, as electrical tape, as a base for artificial leather, as a liner, etc.

The control of elasticity, so that stretchable sheet materials are possible ranging from those that are inelastic to those that are highly elastic, is an important feature. By variation of the vulcanizing technique, a wide variation of constituent proportions can be used to effectuate a wide variation in properties to secure products of differing types for various uses.

Other objects, advantages and features of the invention will be apparent from the following further description.

The unifying composition which I employ is primarily composed of a fluxed blend of broken-down rubber, admixed compatible resin which increases the cementing action upon the fibres of the fabric to bind them firmly, a special type of vulcanizing agent and an activator thereof. A reinforcing pigment may be included to increase cohesiveness and tensile strength, but is not essential. Various modifying agents may also be included, such as fillers, plasticizers, softeners, anti-oxidants, etc. After impregnation or sizing of the fabric with the foregoing composition dispersed in a volatile vehicle, the fabric is suitably heated to drive off the vehicle and vulcanize the rubber. It may then be coated on one or both sides with such further coatings as are desired.

The successful vulcanization of a fluxed blend of broken-down rubber and resin distributed between paper or cloth fibres, so as to obtain improved results as compared with a unified fabric in which the rubber-resin impregnant is not vulcanized, has heretofore not been achieved to the best of my knowledge. Prior attempts have been unsuccessful because the resin and the fibres have acted in such a way that vulcanization would not occur to any appreciable extent under conditions which could be tolerated by the impregnated fabric. That is, vulcanization depends upon temperature and time, and no combination of temperature and time could be found which would cause vulcanization without deteriorating the rubber (and often the resin) to such an extent as to make the fabric "punky" and weaker than it would be if no vulcanization had been attempted. More intensive heating caused resinificatiton of the rubber and made the fabric stiff and brittle. Such prior attempts included the use with sulfur of an accelerating agent and an activator, in an attempt to overcome the difficulty, but without success. It had, therefore, been assumed for some years that vulcanization of rubber-resin impregnated fabrics was not feasible and offered no commercial promise.

I have discovered a technique of vulcanization which goes contrary to expectations and makes possible successful vulcanization, and in a practical manner which is of commercial value because the attendant benefits more than warrant the additional expense of such treatment of the fabric.

My discovery is that of producing vulcanization by the use of a self-vulcanizing organic accelerator, by which is meant that type of organic accelerator which gives a good cure (in the presence of an activator, such as zinc oxide) to sulfur-free rubber stocks. The preferred kind is represented by the thiuram polysulfide accelerators, illustrated by "Tetrone-A" (dipentamethylene-thiuram-tetrasulfide) and "Tuads" (tetramethyl-thiuram-disulfide). These accelerators liberate a nascent form of sulfur during the vulcanization process, which form of sulfur immediately combines with the rubber and, for some reason not known to me, produces vulcanization with use of temperature-time combinations which do not adversely affect the rubber-resin combination. Instead of such vulcanization producing an impregnated paper or cloth which is weaker and "punky" or stiff and brittle, as in past attempts, the unified fabric has substantially as good flexibility and has improved tensile strength, as compared with fabric impregnated with the same rubber-resin composition but with no vulcanization thereof.

By "broken-down" rubber, I mean rubber which has been acted upon so that the "nerve" is reduced and the rubber made less elastic, more plastic, and more penetrative. This can be accomplished by mechanical working in the presence of heat and air (oxygen), as by mastication on a rubber mill and in a mixer. Oxidation plays a necessary part in the process of breaking down and is accompanied by disaggregation and disruption of the rubber particles, and probably depolymerization or degrading of the rubber molecules or macro-molecules also occurs. Whatever the precise mechanism and nature of the change may be, the broken-down rubber permits of securing thorough impregnation of the porous fabric so as to obtain a unified fabric that is flexible or pliant. The degree of breakdown which is necessary depends upon the porosity of the fabric. A cloth or thin open-mesh paper (as in "Troya tissue") requires only a small degree in comparison with paper towelling. The admixed resin further plasticizes the rubber and decreases the viscosity of solutions thereof and assists in cementing the fibres of the fabric.

In order to assist in breaking down the rubber with the least effort, peptizing agents may be employed, as for example R. P. A. No. 1 (zinc chloride double salt of phenyl hydrazine) or naphthyl - beta - mercaptan, which apparently function as oxidation catalysts and aids to depolymerization. Only a small amount, as less than 1% of the rubber, is needed to produce marked results.

The fibrous fabric may be of an unwoven nature such as cotton wadding, a felt or paper. Any type of paper or paper-like sheet may be used so long as it is sufficiently bibulous or porous to permit of penetration by the sizing or impregnating composition to result in the desired unification, which unification may be of one side of the paper or throughout. The paper may be made in whole or in part from wood, rope or rag fibres, or from other fibrous material, natural or synthetic, such as cellulose acetate, glass, etc. Cellulose paper which has been acetylated may be used.

Woven fabrics may be used, such as cloth made from threads or fibres of cotton, wool, hemp, cellulose derivatives, "nylon," glass, etc. An example of a cloth which may be impregnated to secure a good unified fabric suitable for use as an adhesive tape backing or as an electrical tape, is a white broadcloth having an 80 by 144 thread count per square inch.

The paper may be creped, crimped, embossed, molded, or otherwise formed so as to provide rugosities or corrugations, which may be desired to provide substantial stretchability and the ability to conform to curved or irregular outlines or surfaces. For convenience, all such paper will be referred to hereafter as creped paper. The unifying composition is distortable and stretchable and does not impair the aforesaid characteristics. The creped paper may be impregnated without causing a loss of the initial stretch of the paper, which is an important feature. The paper may be given either a "dead-stretch" or a "live-stretch," depending upon the degree of rubber breakdown, proportion and kind of other impregnant components, and degree of vulcanization. A creped towelling paper having a stretch of 25% may be used, for example. The paper may be creped to have a two-way stretch.

A flat, uncreped paper may be employed where stretchability is not needed or wanted, and this may be, for example, a kraft paper.

Desirable types of especially thin unified paper can be made by using paper stock of a hemp fibre kind. An illustration is "Flexrope," a 100% rope paper made of reclaimed rope and characterized by long fibre length, open texture, high tensile strength and great uniformity. Another example is "Troya tissue," made from new manila hemp fibres and characterized by the fact that the fibres largely run in one direction, so that tapes can be made having a high lengthwise tensile strength and a high crosswise tear resistance. "Dextilose" is a manila hemp fibre paper which has substantially the same lengthwise and crosswise tensile strength and tear resistance.

The rubber is preferably latex crepe, but smoked sheets or reclaimed rubber may be used. Since reclaimed rubber ordinarily contains zinc oxide, a reduction may be made in the added zinc oxide when employed, or the latter may be omitted. Equivalent vulcanizable synthetic or artificial rubbers and rubber-like resins may be substituted for all or part of the natural rubber.

The resin should be compatible with the rubber (both before and after vulcanization) so as to form a homogeneous blend and should improve the cementing of the fabric fibres and make the rubber more plastic and penetrative. The resin should also be water-insoluble so that the unified paper will be resistant to moisture and water and be non-hygroscopic. The technique of vulcanization permits the use of both solid and fluid resins. Without vulcanization, a fluid resin would make the impregnant too soft and lacking in cohesive strength, particularly when the rubber is highly broken down; but vulcanization of the rubber can, in accordance with this invention, be used to firm up the rubber to the point of securing the desired cohesive strength of the impregnant.

In general, the useful range of resin is 25 to 400 parts by weight per 100 parts of rubber. The optimum proportion will depend upon the type of product desired, the degree of rubber breakdown, the proportion of reinforcing pigment which may be used, the degree of vulcanization, the type of resin, the type of fabric, and the presence of modifiers, etc. The upper limit of resin proportion is determined by the need of obtaining a flexible unified fabric of good strength. If a solid resin is used, too high a proportion will result in stiffness and brittleness, while too high a proportion of fluid resin will result in inadequate cohesiveness which cannot be overcome by increased vulcanization.

Examples of suitable solid resins are rosin (which may be gum rosin or wood rosin), ester gum, hydrogenated rosin, hydrogenated ester gum, damar, copal, cumar, "Nevillite resin" (a cycloparaffin polymer), and an oil-soluble heat-hardenable phenol-aldehyde resin that is set up during heating of the impregnated fabric. Fluid resins are illustrated by "Hercolyn" (hydrogenated methyl abietate), "Abalyn" (methyl abietate) and "Vistac" (isobutylene polymer which is viscid and sticky). Mixtures of two or more of the resins may be used.

Rosin is a preferred resin, particularly when employed in conjunction with zinc oxide, in which case the compounding of the impregnant results in the rosin being "hardened" by the zinc oxide whereby zinc abietate is produced and is the actual resin used in unifying the fabric. While it is preferred to harden the rosin in situ during the compounding, it may be hardened in advance by treatment with zinc oxide, etc. The amount of zinc oxide consumed by the reaction, when carried to completion, is not over about 8 parts by weight per 100 parts of rosin. Other basic oxides may be used in place of or in conjunction with zinc oxide to form insoluble resinates. Thus a small amount of lime (preferably hydrated lime) may be incorporated in the mix, or a small amount of magnesia. The preferred proportion of rosin to be used in making masking tape backings and the like is 75 to 175 parts per 100 parts of rubber.

Both the zinc abietate and the limed rosin (calcium abietate) will function as activators for the accelerator, making it unnecessary to have free zinc oxide or other activator present when these hardened rosins are present, although in some cases an additional activator may be desirable or useful.

Where zinc oxide is used as an activator, the minimum proportion needed is about 5 parts per 100 parts of rubber, and this amount will function even though the zinc oxide reacts with rosin to form zinc abietate.

The use of a larger proportion of zinc oxide than may be required for the foregoing purposes, is generally desirable in order to provide a reinforcing pigment to increase the cohesive strength of the impregnant and the tensile strength and aging properties of the unified fabric, as well as to provide opacification. The upper useful limit is about 400 parts per 100 parts rubber, and the optimum proportion depends upon the type of tape being made. For a soft, flexible type of backing, the proportion should be kept low. In the case of backings for masking tapes, and like unified paper, the preferred proportion is 50 to 125 parts per 100 parts rubber.

Other reinforcing pigments may be used. Dixie clay may be used in about the same way as zinc oxide. In the case of carbon black, the upper limit of usefulness is generally 50 parts per 100 parts rubber and it is ordinarily best not to go above 10 parts. Inert fillers, such as whiting, may be used to a limited extent. These materials do not function as activators and zinc oxide or other activator must be present.

EXAMPLE 1

Two batches are compounded, to be united shortly before paper treatment, having the following formulae, in parts by weight.

*Rubber-resin solution*

| | Parts |
|---|---|
| Latex crepe | 100 |
| Rosin | 160 |
| Zinc oxide | 100 |
| Beta-naphthol (antioxidant and optional) | 1 |
| Oleum spirits (volatile petroleum hydrocarbon solvent of 306°–424° F. boiling range) | 200 |

*Vulcanizer solution*

| | Parts |
|---|---|
| "Tetrone - A" (dipentamethylene - thiuramtetrasulfide) | 3 |
| Latex crepe | 3 |
| Oleum spirits | 24 |

The rubber-resin solution is prepared by milling the rubber and zinc oxide for 30 minutes, at about 150°–160° F., and the resultant sheet is then taken off and placed in an internal mixer (such as a Baker Perkins Mogul mixer), the heating jacket of which carries steam at 40 lbs. pressure, and which has previously been allowed to warm up. A small proportion of the rosin (say 10–25%) is added to make for lubrication and a lower power requirement, and the mass is mixed for about 8–10 hours, or until reduced to a semi-fluid consistency. The rosin may be omitted from this stage of compounding, but with an increase in the power requirement; and an even greater proportion, or all, of the rosin may be added, but with a considerable increase in the time required to produce the same degree of rubber breakdown.

The balance of the rosin is added, care being taken to add slowly to avoid excessive foaming caused by the water evolved from the reaction between rosin and the zinc oxide, and mixing is continued for another hour. The beta-naphthol is added (if used), and the steam turned off and cooling water introduced into the heating jacket of the mixer. The oleum spirits is then added with continued mixing for half an hour, or until the mixture is homogeneous. The resulting solution may then be drawn off and stored until use.

The vulcanizer solution is prepared by milling together the "Tetrone-A" and rubber and dissolving in the oleum spirits. This procedure facilitates admixture of the vulcanizer with the rubber-resin solution.

The vulcanizer solution is mixed in with the rubber-resin solution just prior to use of the latter for the fabric treatment, as the composite solution starts to gel within a few hours, even at room temperature.

The fibrous sheet material may be impregnated with the impregnating solution in any suitable manner that will deposit a sufficient amount of solids within the fibre structure to produce adequate unification.

A direct saturation method may be used on ordinary sheets of low density (high porosity). The sheet is passed through the impregnating solution until thoroughly permeated, and then between a pair of squeeze rolls to remove undesired excess from the surface. An alternative procedure, where the sheet is denser, is to presaturate with a diluted solution (obtained by diluting the stock impregnating solution, given in the above examples, some 20–30% by adding additional solvent), so as to obtain thorough penetration, dry, and then proceed with impregnation with the regular impregnating solution as described above.

When the sheet is extremely thin and porous, satisfactory results will be obtained by passing between two horizontal rollers, the lower of which dips into the impregnating solution, so as to apply the solution directly to one side only. The solution will be carried through the sheet by capillarity. The rollers are set so as to remove excess from the upper side of the sheet, but the lower side which directly receives the solution will be somewhat denser than the other and will bear a slight excess.

When using relatively heavy paper, a convenient procedure is to apply a diluted solution to one side and thereafter apply the standard solution to the reverse side. This order of treatment drives out the air before the more concentrated solution is used. A somewhat similar expedient is to float the paper on the surface of the impregnating solution and then submerge it before it leaves the impregnating bath.

It should be observed that variation in the proportion of solvent will affect the weight of solids incorporated into the fibrous sheet. Too little solvent will make for too high a viscosity for best penetration, and too much will produce undesirable dilution and not enough solids will be left in the sheet.

Following impregnation, the fabric sheet is festooned on racks and put through a drying oven to remove the solvent and vulcanize the rubber. Various time and temperature combinations may be used to produce substantially equivalent results. An oven treatment involving 12 hours at 170° F. gives good results. By increasing the temperature to 250° F., a heating period of 3 hours has been found suitable. Such temperature-time combinations do not deteriorate the rubber, and result in adequate vulcanization to firm up the rubber and make for a definite improvement in properties of the unified fibre. As previously pointed out, this is a distinguishing feature of my invention.

With respect to the foregoing type of formula, little benefit from vulcanization is obtained with less than 1 part "Tetrone-A" per 100 parts rubber and at least 1½ to 2 parts are needed, in general, to obtain results definitely worth the expense of vulcanization treatment. That is, there is little evidence that vulcanization occurs when less than 1 part "Tetrone-A" is used, and 1½ to 2 parts are generally required to produce a significant increase in tensile strength and aging properties. In the lower range of vulcanizer proportions, broken-down rubber does not regain its nerve sufficiently to prevent the unified fabric (such as creped paper) from having the dead-stretch characteristic which may be desired.

With 6 parts "Tetrone-A" per 100 parts rubber, elasticity begins to be obtained to a definitely recognizable degree and when about 10 parts are used the unified fabric (such as creped paper) will be quite elastic. By cutting down the rosin proportion, and also by increasing the zinc oxide (pigment) proportion, a quicker build-up of elasticity occurs with increase of vulcanizer proportion, and vice versa.

The incorporation of sulfur, with or without the inclusion of other accelerators than the self-vulcanizing accelerator, may yield desirable results in some cases, as may the inclusion of another accelerator without addition of sulfur, but in general none of these expedients has been found to add appreciable value to the basic technique.

Example 2

Same formula and procedure as in Example 1 except that 100 parts "Hercolyn" (hydrogenated methyl abietate) is used in place of the rosin and the proportion of "Tetrone-A" is increased to 5 parts to compensate for the use of a fluid resin, being combined with 5 parts rubber and 40 parts oleum spirits in making up the vulcanizer solution. This example also illustrates a composition for unifying creped paper or other fabric to make a dead-stretch sheet.

Example 3

*Rubber-resin solution*

| | Parts |
|---|---|
| Latex crepe | 100 |
| Zinc oxide | 100 |
| Rosin | 100 |
| Beta-naphthol | 1 |
| Oleum spirits | 200 |

*Vulcanizer solution*

| | Parts |
|---|---|
| "Tetrone-A" | 10 |
| Latex crepe | 10 |
| Oleum spirits | 80 |

Same technique as in Example 1. The higher vulcanizer proportion makes for an elastic impregnant so that creped paper or other fabric unified with this compositon has a live-stretch. Adhesive tape having this type of backing is well adapted for use in coil winding, etc.

Example 4

Same as Example 3 except that 50 parts of "Hercolyn" (hydrogenated methyl abietate) is used in place of the rosin. Paper or other fabric unified with this composition also has a live-stretch owing to the proportion of vulcanizer used.

When employing "Tuads" (tetramethyl-thiuram-disulfide) in place of "Tetrone-A," a larger proportion must be used to compensate for the fact that each molecule contains only one sulfur atom available for vulcanization instead of three. Ordinarily an increase of three times the weight used is sufficient to produce the same results.

A wide variety of film-forming materials may be applied to the unified fabric to provide coatings of various types. Likewise various sheet or film materials may be laminated to the unified fabric. In some cases bonding may be facilitated by treating the fabric with the rubber-resin composition so that the side which receives the coating has no excess of the rubber-resin or is incompletely saturated or does not include the rubber-resin. Thus the rubber-resin unifying may be applied to one side of the paper without penetrating through, and the desired coating is applied to the other side. Or the fabric may have an excess of rubber-resin upon one or both sides to provide a smooth surface and the desired coating is applied thereto. An illustrative sizing which may be applied over the vulcanized rubber-resin is shellac, which may be conveniently applied as a 30-50% solution in denatured ethyl alcohol when the web leaves the vulcanizing oven and is still hot, and drying of the shellac may be speeded by then subjecting the web to force-drying for 20 minutes at 140° F. Or a varnish or resin coating may be applied prior to vulcanization and dried (and set up where a heat-advancing resin is present) during the vulcanizing operation.

Unified fabrics may be coated with plasticized nitrocellulose or methacrylate resin or polyvinyl acetal resin (such as polyvinyl butyral), and embossed if desired, to make artificial leathers.

The unified fabric may be used as a backing for adhesive tape by coating one or both sides with adhesive to provide an adhesive coating of a type (as desired) which is activatable by water, solvents or heat, or which may be of the normally tacky and pressure-sensitive type (as one comprised of rubber rendered tacky by a resin or plasticizer).

Thus a long-aging, waterproof, tough, pressure-sensitive cloth adhesive tape may be made by impregnating a broadcloth of 80 by 144 thread count per square inch with the rubber-resin unifying composition of Example 1, so as to fill the cloth and provide a slight excess on the back, followed by vulcanization and back-sizing with shellac, after which a pressure-sensitive adhesive is applied to the face-side.

Among the advantageous features of my invention, the following points may be noted.

(a) A wide versatility in properties of treated fabrics may be secured to meet particular needs, and wider ranges of proportions and types of components may be used with the rubber, owing to the control made possible by vulcanization. Thus fluid resins may be utilized, and a live-stretch fabric produced even when the rubber has been highly broken-down.

(b) The vulcanization improves the tensile strength of the unified fabric without rendering it stiff or brittle. To illustrate this point, a 27 lb. per ream bibulous creped paper was unified in accordance with Example 1 (the paper being saturated) and had a tensile strength of 5 lbs. before unification and 9 lbs. after unification. When unified in the same way but without use of the vulcanization treatment, the tensile strength was 7 lbs. Tests were made on a Schopper tensile tester at a speed of 12 inches per minute, on samples of half-inch width.

(c) The vulcanization increases the useful life of the unified fabric by decreasing aging effects. Unified paper retains the desired resistance to splitting and delamination for a longer period than unified paper which has not been vulcanized.

(d) The vulcanization greatly increases the resistance of the unified fabric to prolonged heating, which otherwise would lead to embrittlement, loss of unification and strength, and discoloration. Thus a unified paper made in accordance with Example 1, upon exposure to 220° F. for 24 hours, did not become brittle or discolored and there was no destruction of unification strength.

(e) Unified paper may be wound in rolls without blocking. Without vulcanization, there is a tendency to block so that turns of the roll may weld together unless a liner is employed, for although the rubber-resin impregnant is relatively non-tacky when absorbed in the paper there is apt to be considerable bonding between contacting surfaces of the unified paper unless this is overcome by vulcanization.

What I claim is as follows, including such range of equivalents as the nature of the invention and of the prior art permits:

1. A flexible sheet comprising an initially porous fibrous fabric sized or impregnated by a highly cohesive composition essentially comprised of the in situ vulcanized fluxed blend of broken-down rubber, admixed compatible resin adapted to increase the cementing action upon the fibres of the fabric and present in the proportion of about 25 to 400 parts per 100 parts of rubber, and a self-vulcanizing organic accelerator of the thiuram polysulfide type and an activator therefor.

2. An article according to claim 1 in which the accelerator is dipentamethylene-thiuram-tetrasulfide.

3. An article according to claim 1 in which the accelerator is tetramethyl-thiuram-disulfide.

4. A flexible sheet comprising an initially porous fibrous paper impregnated and unified by a highly cohesive composition largely composed of the in situ vulcanized fluxed blend of broken-down rubber, admixed compatible resin adapted to increase the cementing action upon the fibres of the paper and present in the proportion of about 25 to 400 parts per 100 parts of rubber, a reinforcing pigment imparting additional cohesiveness, and a self-vulcanizing organic accelerator of the thiuram polysulfide type, said composition including an activator for the latter, said unified paper having a greater tensile strength than untreated paper per se and at least as great as would result without vulcanization of the impregnant.

5. A flexible sheet having a porous fibrous fabric sized or impregnated by a composition deposited from solution in a volatile organic vehicle so as to penetrate and bind the fibres of the fabric and vulcanized in situ after application, largely composed of a fluxed blend of broken-down rubber, admixed resin of the class consisting of rosin and derivatives thereof compatible with rubber and present in the proportion of at least about 25 parts per 100 parts rubber and within the range necessary to produce a flexible composition and fabric, a self-vulcanizing organic accelerator of the thiuram polysulfide type and an activator for the latter.

6. An article according to the preceding claim in which the impregnating composition includes zinc oxide and said accelerator is largely dipentamethylene-thiuram-tetrasulfide present in the amount of at least 1 part per 100 parts of the rubber.

WALDO KELLGREN.